No. 699,188. Patented May 6, 1902.
W. G. KENT.
WATER METER AND RECORDER.
(Application filed Nov. 4, 1901.)
(No Model.) 7 Sheets—Sheet 2.

Witnesses,
A. M. Parkius.
J. A. MacDonald.

Inventor,
Walter George Kent,
By his Attorneys,
Baldwin, Davidson & Wight

No. 699,188. Patented May 6, 1902.
W. G. KENT.
WATER METER AND RECORDER.
(Application filed Nov. 4, 1901.)
(No Model.) 7 Sheets—Sheet 3.
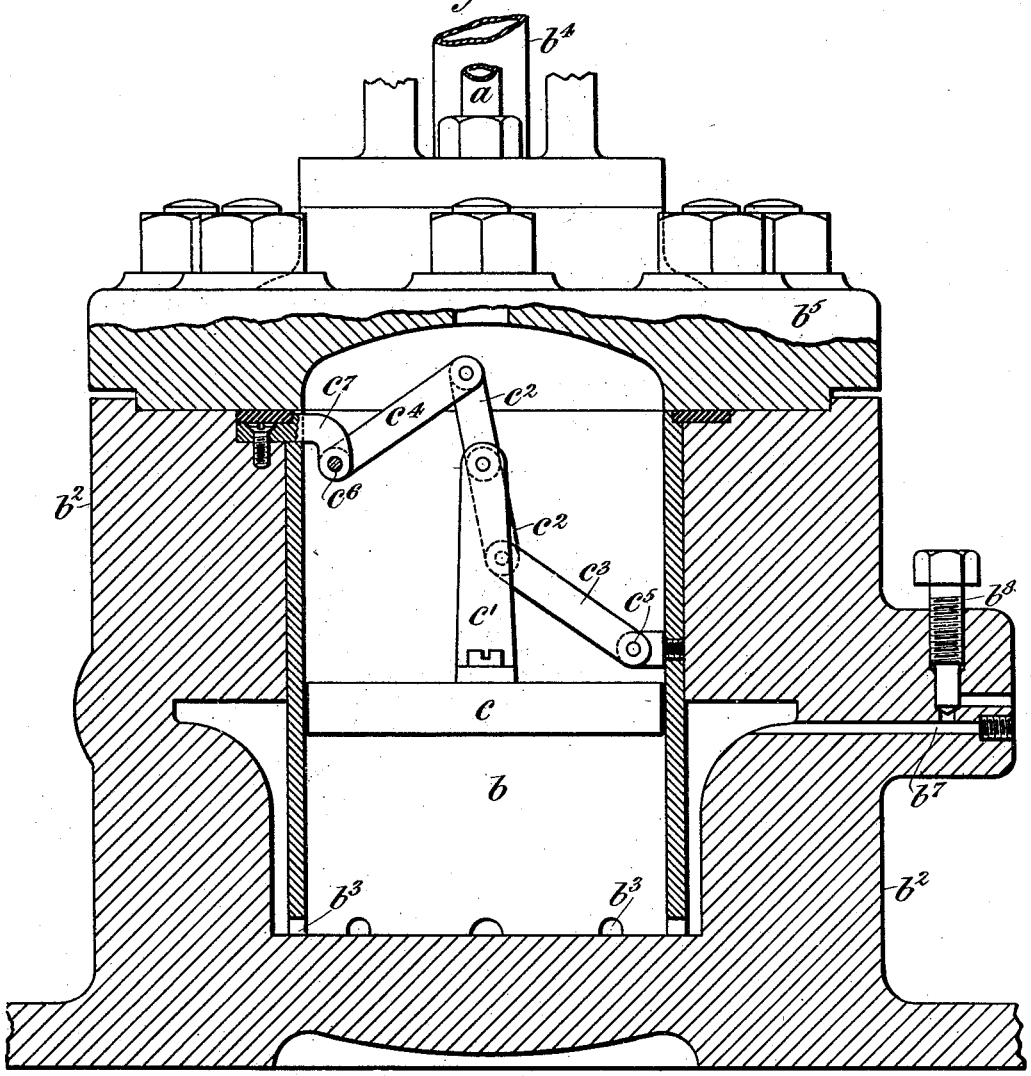
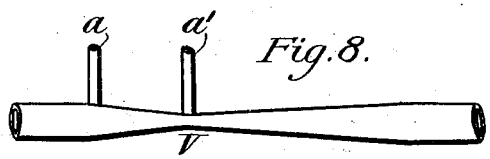

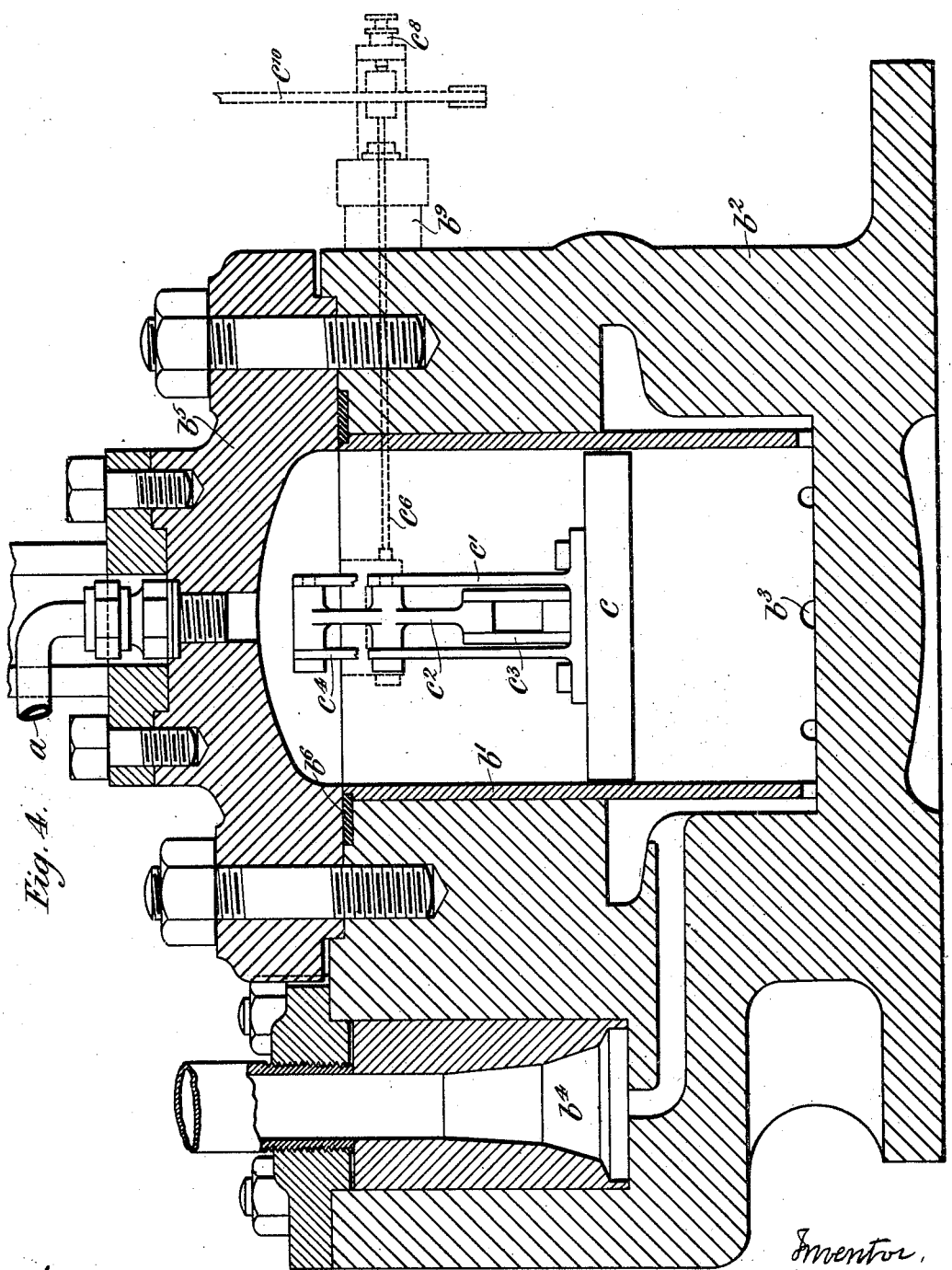

No. 699,188. Patented May 6, 1902.
W. G. KENT.
WATER METER AND RECORDER.
(Application filed Nov. 4, 1901.)
(No Model.) 7 Sheets—Sheet 5.

No. 699,188. Patented May 6, 1902.
W. G. KENT.
WATER METER AND RECORDER.
(Application filed Nov. 4, 1901.)

(No Model.) 7 Sheets—Sheet 6.

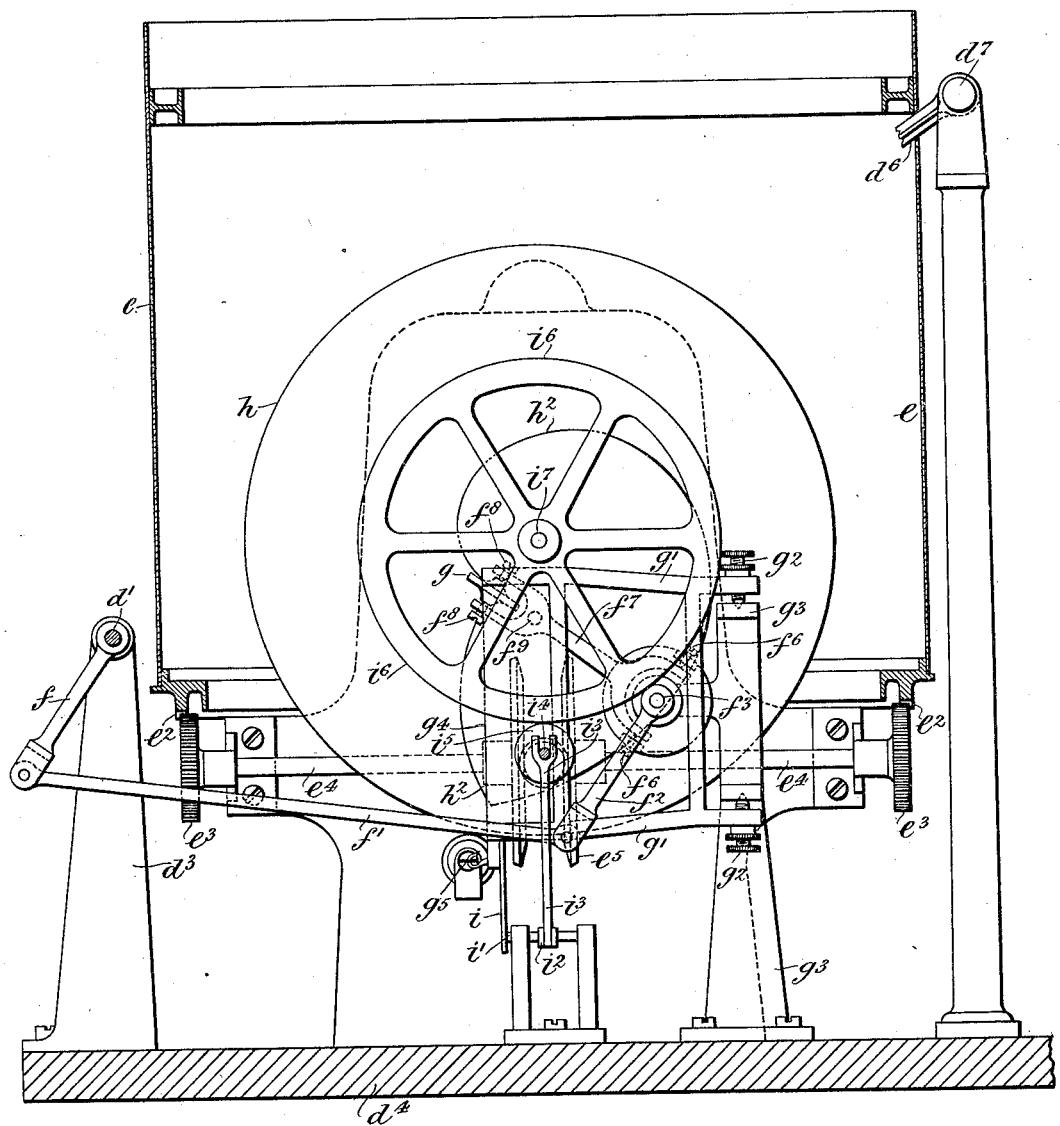

UNITED STATES PATENT OFFICE.

WALTER GEORGE KENT, OF THE COUNTY OF MIDDLESEX, ENGLAND.

WATER METER AND RECORDER.

SPECIFICATION forming part of Letters Patent No. 699,188, dated May 6, 1902.

Application filed November 4, 1901. Serial No. 81,127. (No model.)

*To all whom it may concern:*

Be it known that I, WALTER GEORGE KENT, engineer, a subject of the King of England, residing at 199 High Holborn, in the county of Middlesex, England, have invented a certain new and useful Water Meter and Recorder, of which the following is a specification.

The object of this invention is to provide a water meter and recorder which shall both register the total flow of water through a main and also give a diagram record showing the variations of the rate of flow and which shall be suitable for use with hydraulic-power mains, where the pressure is very great. Both the registering and the diagram are obtained from the difference in pressure at two points in what is known as a "Venturi" meter located in the main and which is in reality merely a contraction in the main, with two pipes opening therefrom, one at the narrowest part of the contraction or throat, the other from a point in the uncontracted main a short distance upstream from the throat, such a meter being described in the specification of Patent No. 381,373 to Herschel.

By my invention I make the apparatus very compact, so that a meter and recorder suitable for use with very high pressures or for ordinary waterworks-pressures can be made small enough to be placed in a hole under the street-pavement, if necessary.

Figure 1:
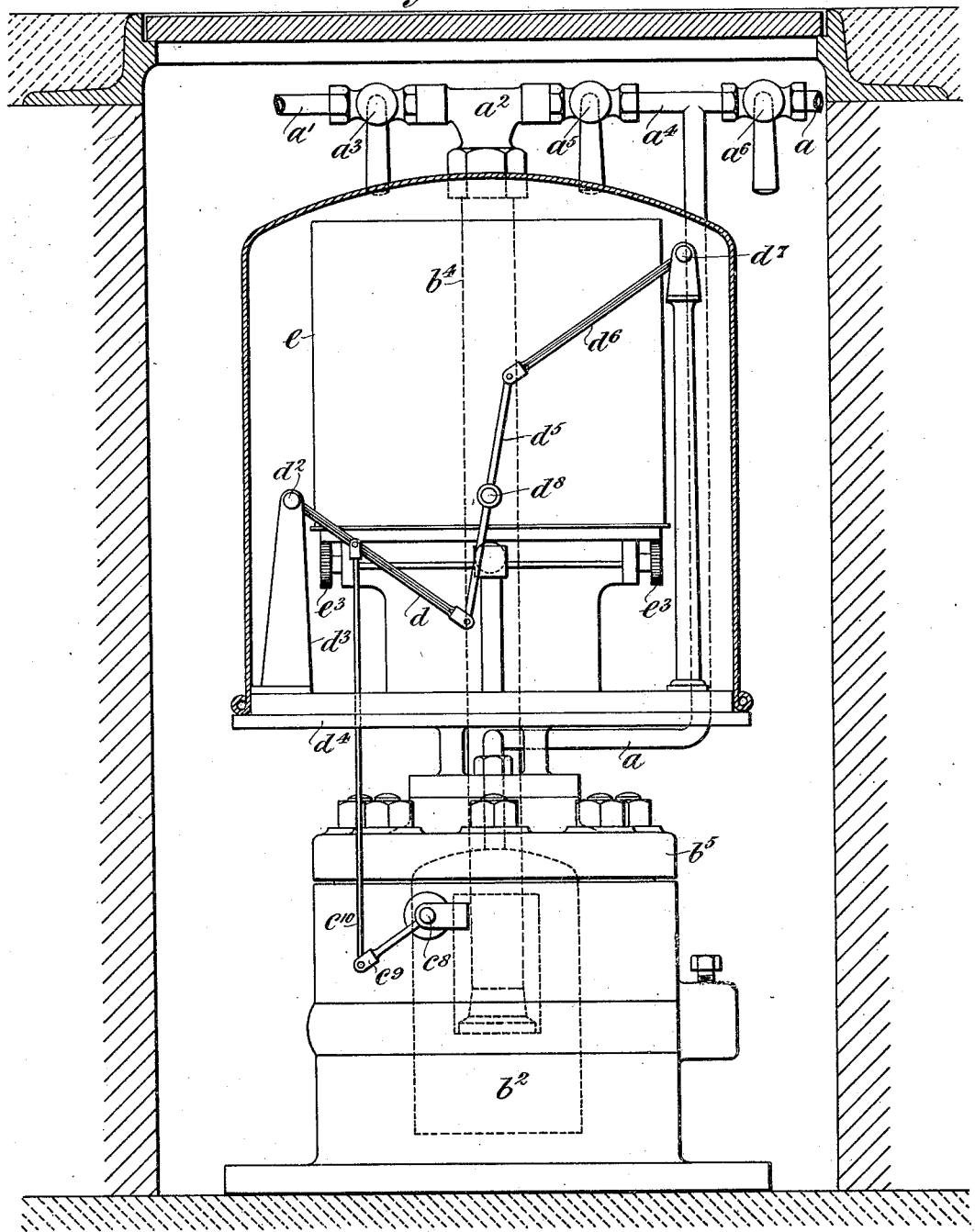
Figure 2:
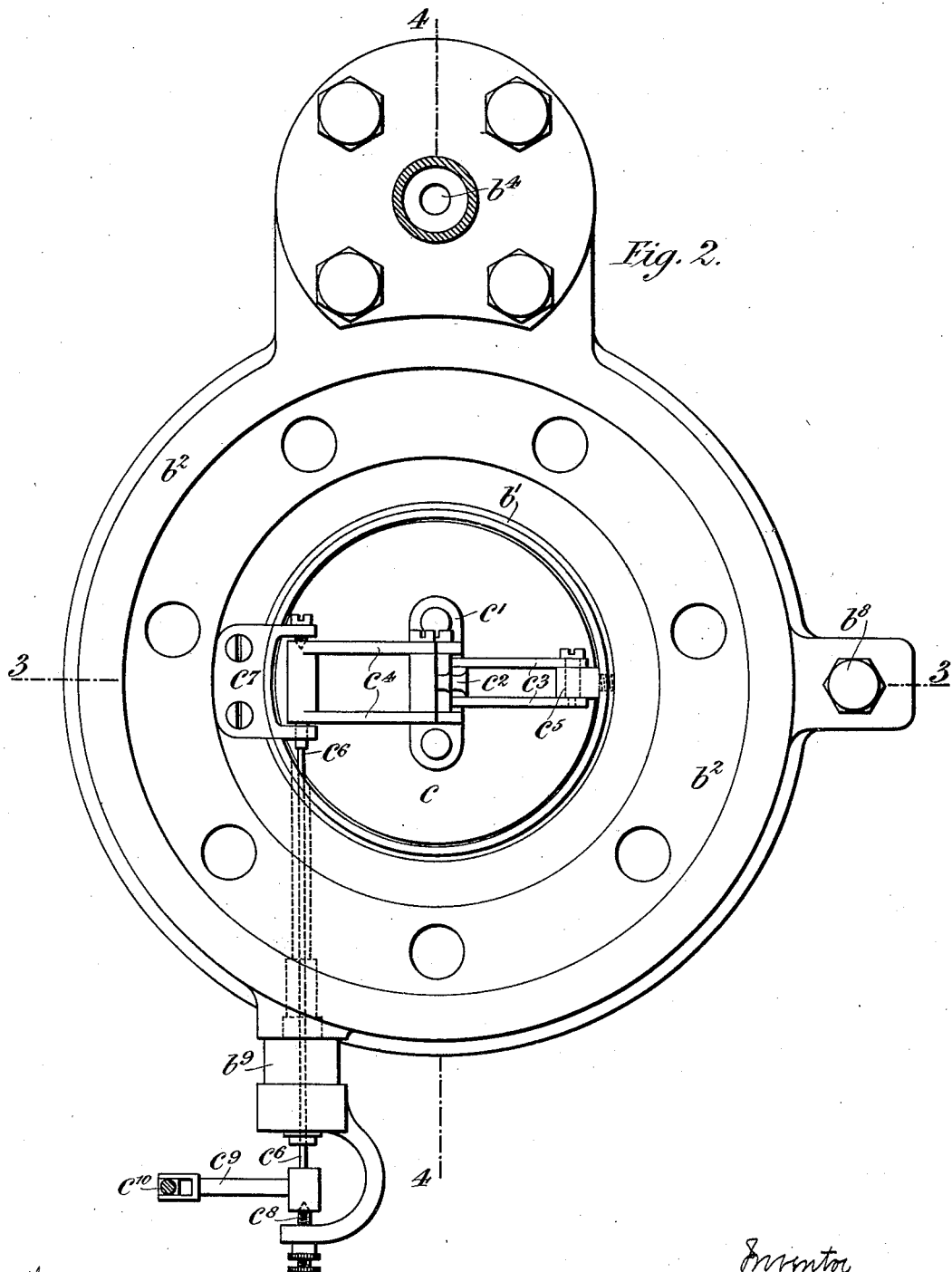
Figure 5:
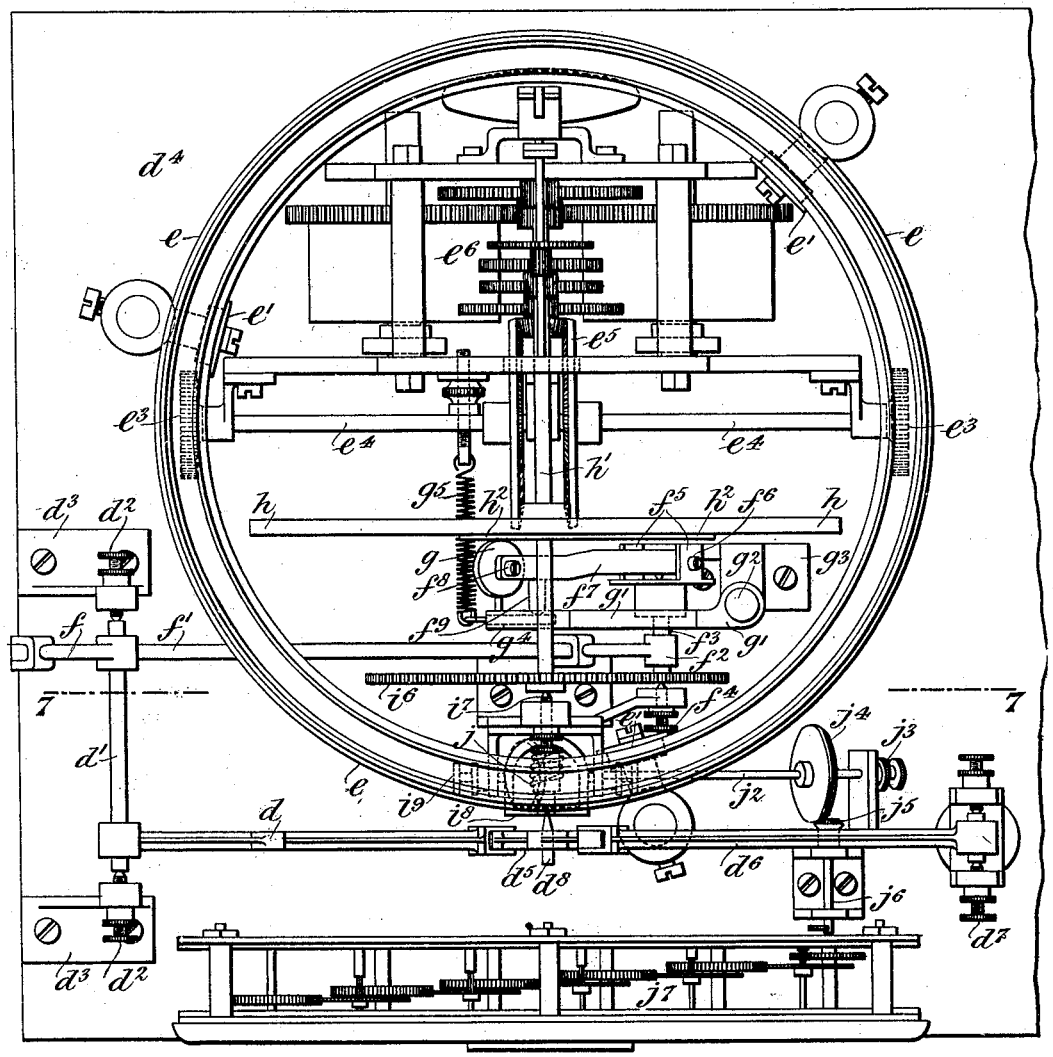
Figure 6:
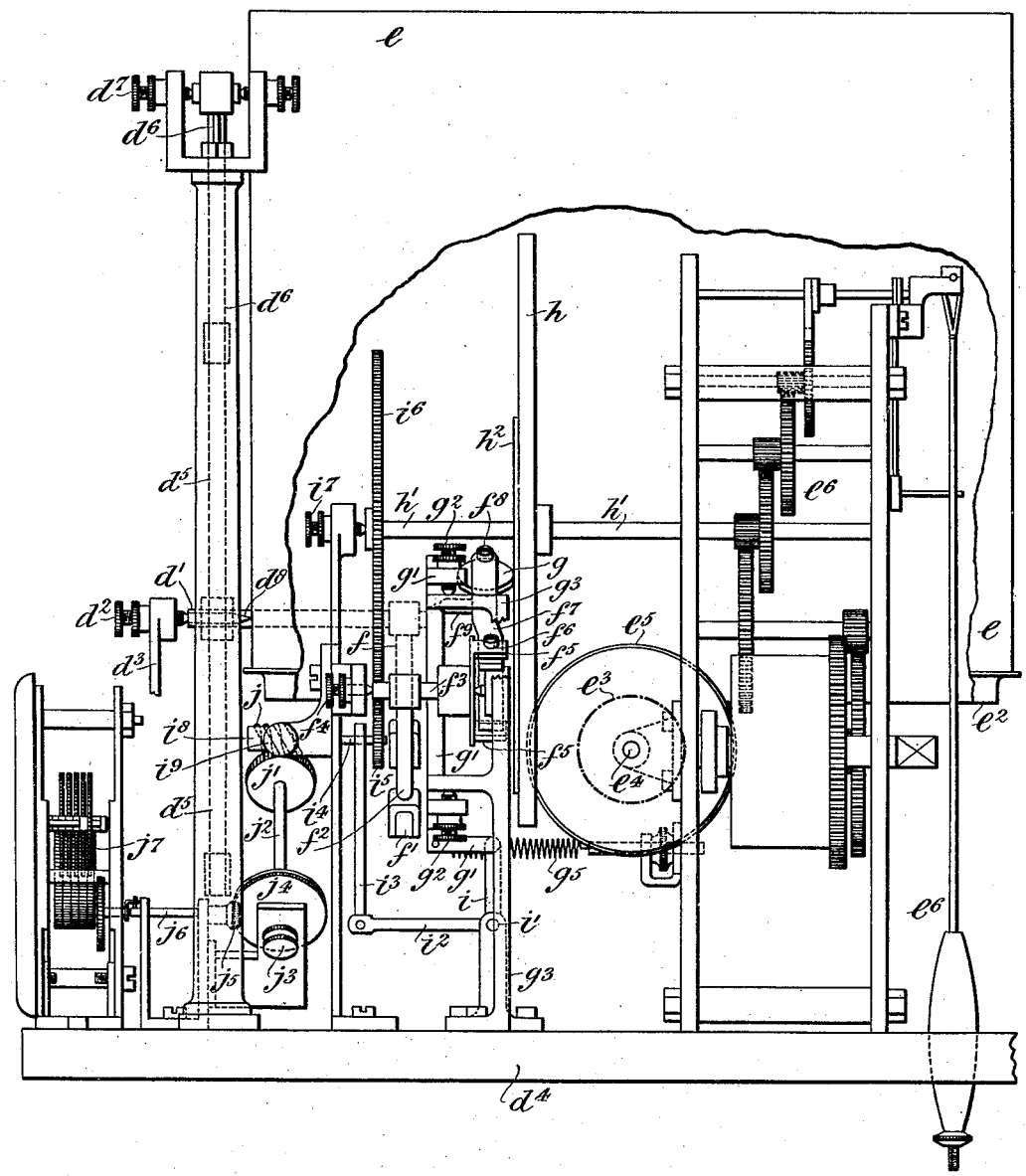

In the drawings annexed, Figure 1 shows, to a small scale, a front elevation of the whole apparatus, with the pipes conveying the throat and upstream pressure from the Venturi meter. Fig. 2 is a plan of the mercury-chamber without its cover. Figs. 3 and 4 are vertical sections on the lines 3 3 and 4 4 of Fig. 2. Fig. 5 is a plan of the upper part of the apparatus without its cover, showing the integrating and registering mechanism, the recording mechanism, and the clockwork for driving the same. Fig. 6 is a side elevation of the same, the diagram-drum being broken away to show the mechanism contained in it. Fig. 7 is a section on the line 7 7, Fig. 5; and Fig. 8 is a detail view illustrating the manner of bringing the upstream and throat pressure from the Venturi meter.

$a\ a'$ are the pipes leading from the main and bringing the upstream and throat pressure from the Venturi meter V. (Shown diagrammatically in Fig. 3.) The pipe $a$ opens directly into the top of the mercury-chamber $b$ above the float $c$, resting on the surface of mercury. The chamber $b$ is formed of a cylinder $b'$, secured in the casting $b^2$, which is bored out, as shown, so as to leave an annular space around the lower part of the cylinder $b'$, into which the mercury can pass by the holes $b^3$. From this space a passage leads to the bottom of the tube $b^4$, which rises up to the T-piece $a^2$, one arm of which is in communication with the pipe $a'$ by the cock $a^3$, while the other may be put in communication with a branch $a^4$ from the pipe $a$ by the cock $a^5$ whenever it is desired to equalize the pressure on the two surfaces of the mercury. A cock $a^6$ is provided in the pipe $a$, which, with the cock $a^3$, can be closed when it is desired to cut off all connection with the main. The mercury-chamber $b$ is closed by a cap $b^5$, through which the pipe $a$ passes and which is bolted to the casting $b^2$, a gutta-percha washer $b^6$ being inserted in a recess left for that purpose, so as to make a water-tight joint. Mercury is introduced into the chamber and the zero-level adjusted by the inlet $b^7$, closed by the screw-plug $b^8$.

Secured to the upper surface of the float $c$ is a frame $c'$, to which is pivoted a lever $c^2$, whose ends are pivoted to pairs of arms $c^3\ c^4$, the first pair of which rock on a pivot $c^5$, while the arms $c^4$ are fast with a spindle $c^6$, turning in bearings $c^7$, carried by the wall of the chamber and passing out through a passage and stuffing-box $b^9$, its outer end being supported by a pivot $c^8$. Fast with the spindle $c^6$ is an arm $c^9$, linked by the link $c^{10}$ to the arm $d$ on the shaft $d'$, rocking on pivots $d^2$, carried by standards $d^3$ on the plate $d^4$, bolted to the cap $b^5$ of the mercury-chamber. It will be seen that as the float $c$ rises and falls owing to the difference of the upstream and throat pressures so the shaft $d'$ will be rocked. From such rocking of the shaft $d'$ the recording and registering are effected as follows: The arm $d$ is linked by the link $d^5$ to an arm $d^6$, rocking on the fixed pivots $d^7$. At the center of the link $d^5$ is a pen $d^8$, whose point is in contact with a sheet of ruled paper carried by the drum or cylinder $e$, supported on rollers $e'$ and around the lower edge of which is a ring of teeth $e^2$, gearing with pinions $e^3$ on spindles $e^4$, driven by bevel-gear $e^5$ from the clock $e^6$, the whole so arranged that the cylinder $e$ may revolve once a week. The pen $d^8$ will thus trace out on the paper a curve the ordinates of which will vary with the rate of flow of water in the main.

In order to register the total quantity of water passing through the main, it is necessary to use an integrating apparatus. This I arrange as follows: Fast with the rock-shaft $d'$ is an arm $f$, linked by the link $f'$ to an arm $f^2$ on a shaft $f^3$, carried on fixed pivots $f^4$ and provided with two lugs $f^5$, carrying pivots $f^6$, on which can turn an arm $f^7$, forked at each end and carrying by pivots $f^8$ an integrating-wheel $g$. $g'$ is a frame turning on pivots $g^2$ on a standard $g^3$ and carrying a piece of glass $g^4$, pressed by the spring $g^5$ against a knob or stud $f^9$ on the arm $f^7$. By this means the wheel $g$ is pressed against the surface of the disk $h$, carried by the spindle $h'$, which is rotated, say, every ten minutes by the clock $e^6$. The disk $h$ has a portion $h^2$ of its surface raised, so that when the wheel $g$ is on this portion $h^2$ the frame $g'$ is turned away from the disk against the spring $g^5$. Pivoted to the frame $g'$ is one arm $i$ of a bell-crank turning on the center $i'$, its other arm $i^2$ carrying a forked rod $i^3$, supporting a spindle $i^4$, carrying at one end a pinion $i^5$, meshing with the toothed wheel $i^6$ on the spindle $h'$, constantly turned on the pivot $i$ by the clock $e^6$. The other end of the spindle $i^4$ is journaled in a stirrup-piece $i^8$, turning on fixed pivots $i^9$, and has upon it a worm $j$, gearing with a worm-wheel $j'$ on the shaft $j^2$, turning in fixed bearings $j^3$ and actuating by the toothed wheels $j^4 j^5$ the spindle $j^6$ of the counting-train $j^7$. It will be seen that so long as the wheel $g$ is on the portion $h$ of the disk the spindle $i^4$ will be held up by the bell-crank $i i^2$ and will be turned, owing to the pinion $i^5$ being in gear with the wheel $i^6$, and so the counting-train will be driven; but when the wheel $g$ is on the portion $h^2$ the counting-train will not be driven. Now since the pressure of water in the main varies as the square of the velocity of flow or of the total quantity of water it will be necessary that the boundary curve of the raised portion $h^2$ be such that the length of path of the wheel $g$ on the portion $h$ may vary as the square root of the measure of the angle through which the shaft $f^3$ is rocked.

What I claim is—

1. The combination of a water-main, a contraction therein, a mercury-chamber, a float moving therein, two pipes conveying pressure from the contracted and uncontracted portions of the main to the float and the mercury, a spindle passing out from the mercury-chamber and turned by the movement of the float, a recording-drum, a pen bearing against the drum, integrating mechanism located within the drum, means operated by the spindle for actuating the pen and the integrating mechanism, means for driving the drum and the integrating mechanism, and a register operated by the integrating mechanism.

2. The combination of a water-main, a contraction therein, a mercury-chamber, a float moving therein, two pipes conveying pressure from the contracted and uncontracted portions of the main to the float and the mercury, a cock in each pipe, means for putting the two pipes in communication, a spindle passing out from the mercury-chamber and turned by the movement of the float, a recording-drum, a pen bearing against the drum, integrating mechanism located within the drum, means operated by the spindle for actuating the pen and the integrating mechanism, means for driving the drum and the integrating mechanism, and a register operated by the integrating mechanism.

3. The combination of a water-main, a contraction therein, a mercury-chamber, a float moving therein, two pipes conveying pressure from the contracted and uncontracted portions of the main to the float and the mercury, a spindle passing out from the mercury-chamber, parallel-motion links connecting the float and the spindle, a recording-drum, a pen bearing against the drum, integrating mechanism located within the drum, means operated by the spindle for actuating the pen and the integrating mechanism, means for driving the drum and the integrating mechanism, and a register operated by the integrating mechanism.

4. The combination of a water-main, a contraction therein, a mercury-chamber, a float moving therein, two pipes conveying pressure from the contracted and uncontracted portions of the main to the float and the mercury, a spindle passing out from the mercury-chamber and turned by the movement of the float, a recording-drum, a pen bearing against the drum, a rock-shaft connected to the spindle, parallel-motion links connecting the pen with the rock-shaft, integrating mechanism located within the drum, means operated by the spindle for actuating the integrating mechanism, means for driving the drum and the integrating mechanism, and a register operated by the integrating mechanism.

5. The combination of a water-main, a contraction therein, a mercury-chamber, a float moving therein, two pipes conveying pressure from the contracted and uncontracted portions of the main to the float and the mercury, a spindle passing out from the mercury-chamber, parallel-motion links connecting the float and the spindle, a recording-drum, a pen bearing against the drum, a rock-shaft connected to the spindle, parallel-motion links connecting the pen with the rock-shaft, integrating mechanism located within the drum, means operated by the spindle for actuating the integrating mechanism, means for driving the drum and the integrating mechanism, and a register operated by the integrating mechanism.

6. The combination of a water-main, a contraction therein, a mercury-chamber, a float moving therein, two pipes conveying pressure from the contracted and uncontracted portions of the main to the float and the mercury, a spindle passing out from the mercury-chamber and turned by the movement of the float, a recording-drum, a pen bearing against the drum, means operated by the spindle for actuating the pen, means for driving the drum, a shaft rocked by the movement of the float, a pivoted arm rocking with the shaft, a wheel carried by the arm, an integrating-disk on which the wheel runs, means for constantly rotating the disk, a counting-train, and means operated by the movement of the wheel for actuating the counting-train.

7. The combination of a water-main, a contraction therein, a mercury-chamber, a float moving therein, two pipes conveying pressure from the contracted and uncontracted portions of the main to the float and the mercury, a spindle passing out from the mercury-chamber and turned by the movement of the float, a recording-drum, a pen bearing against the drum, means operated by the spindle for actuating the pen, means for driving the drum, a shaft rocked by the movement of the float, a pivoted arm rocking with the shaft, a wheel carried by the arm, an integrating-disk on which the wheel runs, means for constantly rotating the disk, a pivoted frame, a spring pulling the frame in one direction, a shed on the pivoted arm moving the frame against the spring, a bell-crank turned by the frame, a constantly-rotating toothed wheel, a pivoted spindle carried by the bell-crank, a pinion on this spindle meshing with the toothed wheel, a counting-train, and means for actuating the counting-train from the pivoted spindle.

8. The combination of a water-main, a contraction therein, a mercury-chamber, a float moving therein, two pipes conveying pressure from the contracted and uncontracted portions of the main to the float and the mercury, a spindle passing out from the mercury-chamber and turned by the movement of the float, a recording-drum, rollers supporting the drum, a rack of teeth on the lower edge of the drum, a pair of pinions gearing with the rack, a pair of shafts fast with the pinions, bevel-gear driving the shafts, a pen bearing against the drum, integrating mechanism located within the drum, means operated by the spindle for actuating the pen and the integrating mechanism, a clock driving the bevel-gear and the integrating mechanism, and a register operated by the integrating mechanism.

WALTER GEORGE KENT.

Witnesses:
JOHN H. WHITEHEAD,
FREDK. C. WEATHERLY.